United States Patent [19]

Helling et al.

[11] Patent Number: 4,663,796
[45] Date of Patent: May 12, 1987

[54] TOOL ASSEMBLY

[76] Inventors: Loren L. Helling; Marlene M. Helling, both of 1645 Taylor, Sheridan, Wyo. 82801

[21] Appl. No.: 750,509

[22] Filed: Jul. 1, 1985

[51] Int. Cl.$^4$ .............................................. B25G 3/20
[52] U.S. Cl. .................................... 15/144 A; 15/145; 51/180; 81/177.85; 403/315; 403/328
[58] Field of Search ............... 15/144 A, 145; 51/180; 81/177.2, 177.85; 403/315, 316, 325, 328

[56] References Cited

U.S. PATENT DOCUMENTS

| 2,290,215 | 7/1942 | Stenberg | 403/328 |
| 2,697,942 | 12/1954 | Rudy | 15/145 X |
| 2,796,619 | 6/1957 | Hammer | 15/145 X |
| 3,407,424 | 10/1968 | Lanzarone et al. | 15/145 |
| 3,693,484 | 9/1972 | Sanderson | 403/328 X |
| 3,929,343 | 12/1975 | Wanner et al. | 279/1 B |
| 4,132,147 | 1/1979 | Contaldo | 89/1.5 G |
| 4,198,080 | 4/1980 | Carpenter | 403/325 X |
| 4,407,039 | 10/1983 | Moss | 15/144 A |
| 4,453,449 | 6/1984 | Hollmann | 403/328 X |

FOREIGN PATENT DOCUMENTS 1108528 6/1961 Fed. Rep. of Germany ...... 403/325

OTHER PUBLICATIONS

Goldblatt Tool Co. catalog, p. 69.

Primary Examiner—Chirs K. Moore
Attorney, Agent, or Firm—Burd, Bartz & Gutenkauf

[57] ABSTRACT

A surface-working tool assembly having a surface-working tool connected by a quick releasable coupling to an elongate handle member. One portion of the coupling is connected to the tool and the other is connected to the handle. The tool portion is connected by a universal joint permitting rotational movement about first and second perpendicular axes. A female portion of the connecting means includes first and second telescopically engaged sleeves, the inner sleeve having a tubular passage and radial openings containing locking elements movable into and out of blocking relationship in the tubular passage. The outer sleeve is movable from a position holding the locking elements of the inner sleeve in blocking relationship to the tubular passage, to a second position where an inner annular recess is aligned with the locking elements to permit movement thereof out of blocking relationship to the tubular passage wherein a shank member of the male portion of the coupling means can be inserted and withdrawn from the tubular passage. The shank member has a reduced diameter portion which can be situated in alignment with the radial openings of the inner sleeve so that the locking elements are movable into position around the neck to hold the shank member releasably connected to the inner sleeve and locked in that position when the outer sleeve is moved to a position preventing movement of the locking elements out of the tubular passage.

15 Claims, 6 Drawing Figures

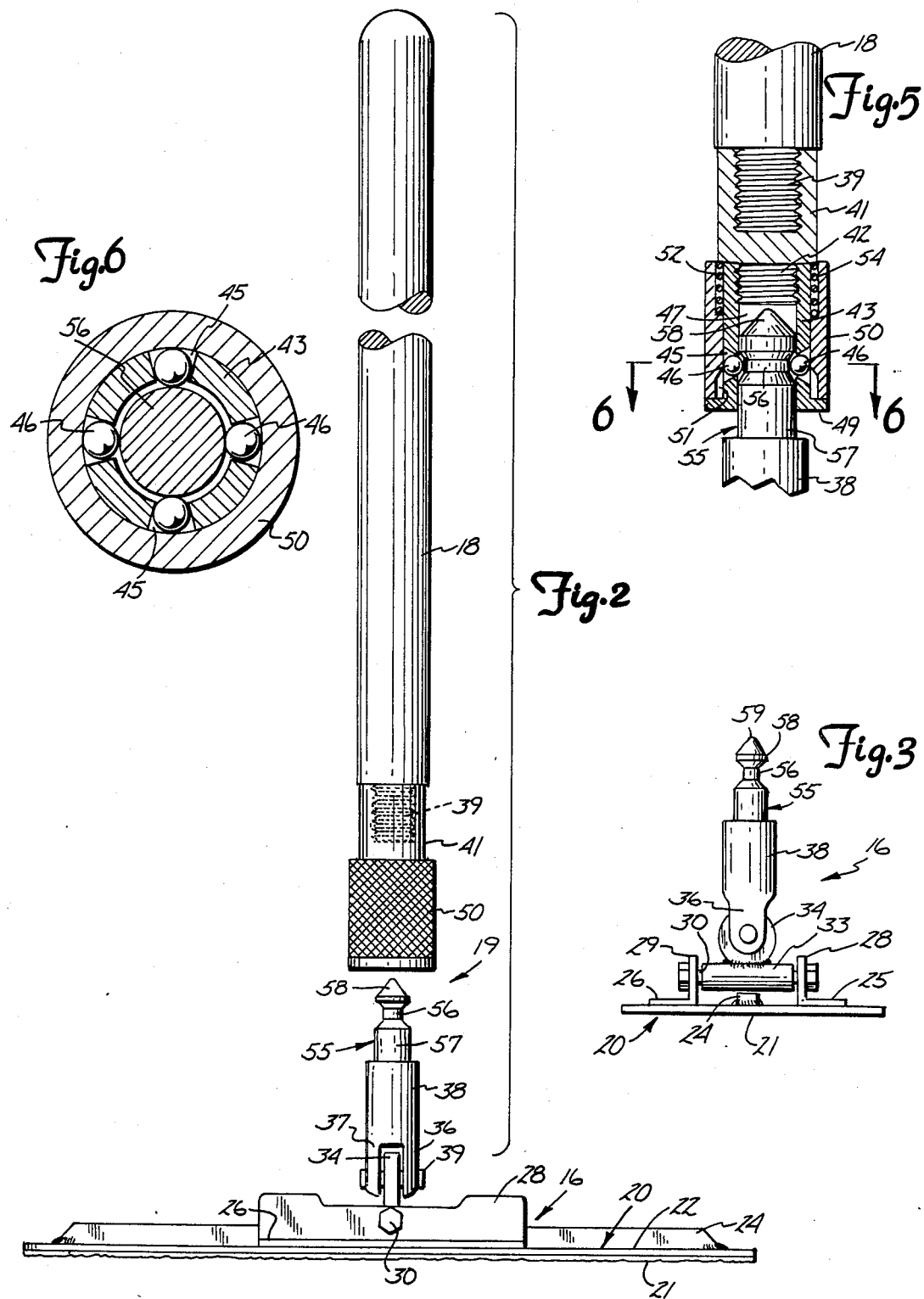

TOOL ASSEMBLY

BACKGROUND OF THE INVENTION

The invention relates to a tool assembly for use in finishing textured surfaces, particularly wall and ceiling surfaces, which have been recently coated with drywall cement or spread with a texture paint.

Once applied to a wall or ceiling, a surface coating, such as a drywall cement or a texture paint, must be gone over with a trowel or similar tool in order to either smooth the surface over or impart to it a desired texture or repetitive design, such as a Spanish lace or knockdown spatter. This is usually done by a workman standing on a ladder or through the use of stilts or scaffolding. All of these means pose the danger of falling. Scaffolding and ladders require a certain amount of set-up and take-down time and can pose difficulty in transport, such as being taken to and from an upstairs bedroom. Scaffolding and ladders must be periodically moved from place to place in order to complete work in a room.

SUMMARY OF THE INVENTION

The invention pertains to a tool assembly including a surface-working tool connected to an elongate handle assembly. The surface-working tool typically has a flat planar base with a working surface or face on one side and mounting means on the other for connection to the handle assembly. The handle assembly includes an elongate pole or handle having one portion of a coupler assembly at one end. The tool carries the other portion of the coupler assembly which, when assembled with the pole, permits axial rotation of the handle with respect to the tool. The portion of the coupling assembly assembled to the tool is mounted by a universal swivel arrangement to permit lateral rotation of the handle with respect to the working face of the tool. The coupling assembly is comprised as a quick release male-female type assembly whereby the handle assembly is quickly removed for use without the handle in confined spaces. The handle is a relatively elongated cylindrical member used by a workman standing on the floor of a room and doing work on the ceiling to eliminate the need for stilts or other upright structure to stand on.

The female portion of the coupling assembly between the handle and the tool includes a mounting sleeve having coplanar radial side wall openings accommodating spherical locking elements. A locking sleeve is slidably disposed over the mounting sleeve. The inner wall of the locking sleeve normally holds the spherical locking elements inward of the radial openings of the mounting sleeve so that they partially intrude into or block the tubular passage of the mounting sleeve. This is the locking position of the spherical elements. The locking sleeve has an inner annular recess movable with the locking sleeve to be positioned in radial alignment with the openings of the mounting sleeve to permit movement of the locking members out of the tubular passage of the mounting sleeve and partially into the recess of the locking sleeve. This is the open position of the locking elements.

The male portion of the coupling assembly includes a shank having a cylindrical head portion with a diameter just less than the inner diameter of the tubular passage of the mounting sleeve. A reduced neck portion is disposed behind the head portion on the shank. The shank is inserted in the tubular passage of the mounting sleeve when the locking elements are in the open position to a point where the neck of the shank is aligned with the radial openings of the mounting sleeve. The locking sleeve is then moved to a position causing inward movement of the locking elements into the passage of the mounting sleeve and into a position occupying the space around the reduced neck portion of the shank. The locking elements prevent withdrawal of the head portion of the shank from the tubular passage of the mounting sleeve and accordingly, releasably couple the male and female portions of the coupling assembly.

IN THE DRAWINGS

FIG. 2 is a side elevational view of a tool assembly according to the invention showing the handle foreshortened for purposes of illustration and the tool in disassembled relationship from the handle assembly;

FIG. 3 is an end elevational view of the tool of FIG. 2;

FIG. 5 is an enlarged view in section of the coupling assembly of the tool assembly of the invention; and FIG. 6 is an enlarged sectional view of a portion of the coupling assembly of FIG. 5 taken along the line 6—6 thereof.

DESCRIPTION OF A PREFERRED EMBODIMENT

Figure 1:
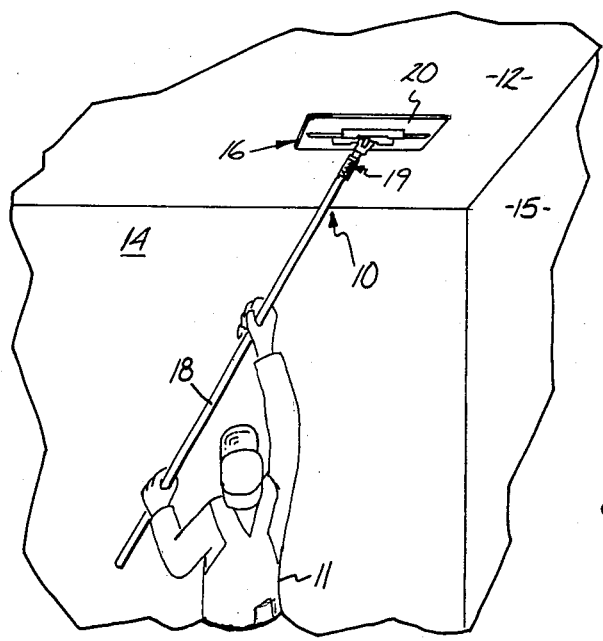
FIG. 1 is a perspective view of a workman using a tool assembly according to one form of the present invention.

Referring to the drawings, there is shown in FIG. 1 a tool assembly according to the invention indicated generally at 10 in use by a work person 11 performing work upon a ceiling 12 of a room also bounded by walls 14, 15. Tool assembly 10 is useable to distribute and properly spread a coating, such as a textured paint or plaster, on ceiling 12 or other location somewhat physically remote from work person 11. Tool assembly 10 includes a tool 16 connected to an elongate longitudinal handle 18 by a coupling assembly 19. Handle 18 is universally movable with respect to the tool 16 and axially rotatable about its longitudinal axis with respect to the tool permitting a great measure of maneuverability of the tool 16 by the work person 11.

Figure 4:
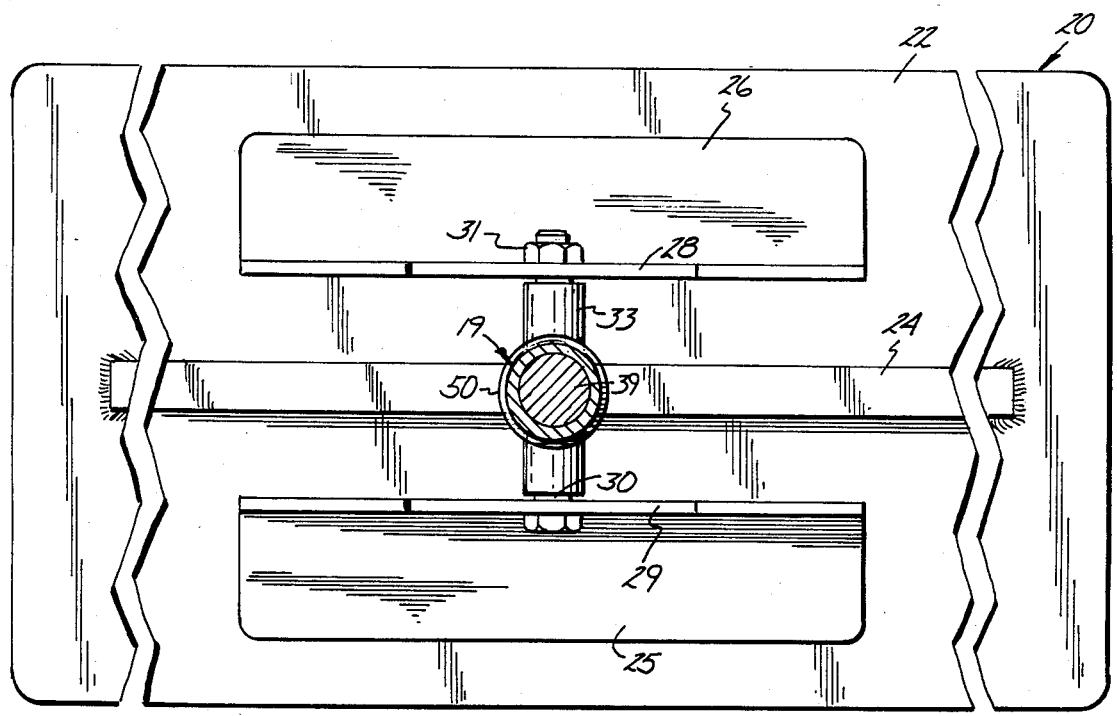
FIG. 4 is an enlarged top view of the tool assembly of the invention with the sides foreshortened and showing the handle in section.

Referring to FIGS. 2–4, tool 16 includes a generally rectangular base 20 having a first flat working surface 21 on one side and mounting structure on the other for universal connection to handle 18. The first surface 21 of base 20 is flat and generally smooth to serve a trowel-like function in smoothing paint or imparting a design to textured paint. Peripheral edges bounding surface 21 are preferably rounded to facilitate troweling. A rib 24 is centrally disposed on the second side or top surface 22 of base 20 for purposes of strength.

Parallel right angle brackets 25, 26 straddle rib 24 and have parallel flat plates fixed to the second surface 22 of base 20 and upstanding parallel walls 28, 29. A first pivot pin comprised as an elongate bolt 30 extends between the upstanding plates 28, 29 and is secured by a bolt head at one end and a nut 31 threaded onto the opposite end to secure the shank of bolt 30 between the plates. A pivoting collar 33 is mounted for rotation on bolt 30 about an axis coincidental therewith and parallel to the plane of base 20.

An upstanding toroidal eye 34 is fastened to collar 33 and has an opening which has an axis perpendicular to the axis of sleeve 33. A yoke having bifurcated legs 36, 37 straddles eye 34. The yoke is part of a body 38 partially comprising one portion of connecting means 19 to join the tool and the handle 18. A second pivot pin 39 passes through the opening in eye 34 and is connected to the legs 36, 37 for pivotal movement about an axis perpendicular to the pivot axis of sleeve 33. First pivot pin 30, sleeve 33, eye 34, second pivot pin 39 and yoke legs 36, 37 form a universal joint for the tool 16 in connection with handle 18 to permit orientation of the longitudinal axis of handle 18 at any needed angular relationship with the working surface 21 of base 20 of tool 16.

Handle 18 has a reduced diameter threaded end 39 which is threadably connected to the female portion of coupling 19. Threaded end 39 is threadably connected with an interiorly threaded portion of a cylindrical body 41 (see FIG. 5). Body 41 has a reduced diameter external threaded stub end 42. Stub end 42 is connected to an internally threaded end portion of a cylindrical tubular mounting sleeve 43. As shown in FIGS. 5 and 6, a plurality of coplanar radial openings 45 extend through the side wall of mounting sleeve 43 near the opposite end thereof. Four openings 45 are shown, although more or less could be provided. In each opening 45 is situated a spherical locking element or ball 46 having a diameter larger than the length of the opening 45. Mounting sleeve 43 has an internal passage 47. When the side surfaces of locking balls 46 are aligned with the outer surfaces of mounting sleeve 43, each of the balls 46 partially protrudes into the passage 47 of mounting sleeve 43. Openings 45 are somewhat inwardly tapered to prevent balls 46 from falling into passage 47. The end of mounting sleeve 43 opposite the body portion 41 is provided with an outwardly extended annular flange 49.

A locking sleeve 50 has an internal diameter slightly larger than the external diameter of mounting sleeve 43 and is slidably accommodated over mounting sleeve 43 for longitudinal movement with respect to mounting sleeve 43 within certain limits. As shown in FIG. 5, flange 49 limits the movement of the locking sleeve in one direction with the internal side walls of the locking sleeve holding the locking balls 46 in a locking position or in a position partially protruding into the passage 47 of mounting sleeve 43. The end of locking sleeve 50 abutting the annular flange 49 has an internal annular recess 51. The opposite end of locking sleeve 50 has an internal annular groove 52 in which there is disposed a helical compression spring 54. Spring 54 is constrained at the outward end by the confronting face of cylindrical body part 41. Groove 52 is of sufficient diameter to permit the adjacent end of locking sleeve 50 to be moved over the outer surface of cylindrical body portion 41. Such movement moves the inner annular recess 51 to a position in alignment with the openings 45 whereby the locking balls 46 are movable to a position partially occupying the annular recess 51 and out of protruding or blocking relationship with respect to the tubular passage 47 of mounting sleeve 43. Locking sleeve 50 is normally biased by the helical spring 54 in a position as shown in FIG. 5 with the end abutting the flange 49 and the side wall holding the locking balls in position partially protruding into the passage 47.

The other portion of coupling 19 includes a cylindrical shank 55 extended from body 39 and having a diameter corresponding to the inner diameter of mounting sleeve 43 for a slip-fit relationship with respect to the passage 47. Shank 55 has a stem 57 and a reduced diameter neck portion 56, and terminates in a head 58 having a conical tip 59. The head 58 corresponds in diameter to the stem 57 of shank 55 such that shank 55 is insertable in the passage 47 of the mounting sleeve 43. Upon inserting shank 55 in the passage 47, locking sleeve 50 is manually moved longitudinally against the bias of the spring 54 to move the annular recess 51 in alignment with openings 45 to permit movement of the locking elements 46 to a position out of locking relationship to the passage 47. Shank 55 is then inserted into the passage 47 to a position where the reduced diameter neck portion 56 is in alignment with the radially aligned openings 45 of the mounting sleeve 43. The locking sleeve 50 is moved back to the closed position which moves the locking balls 46 back into a position partially protruding into the passage 47 and also occupying the space around the reduced diameter neck portion 56 adjacent the head 58 such that shank 55 is longitudinally immobile with respect to the passage 47 but is axially rotatable with respect to it. Accordingly, in the assembled relationship as shown in FIG. 5, the handle 18 is axially rotatable with respect to the tool 16.

In order to quickly release the coupling 19 from that position shown in FIG. 5, the locking sleeve 50 is moved longitudinally upward to the position where locking elements 46 are aligned with and moved into the annular recess 51 and out of the tubular passage 47, thereby freeing the shank 55 to be moved outward. The radial openings 45 in the mounting sleeve 43 are inwardly tapered such that the passage at the inner surface of the sleeve 43 is less than the full diameter of the locking spheres 46. This prevents the locking spheres 46 from falling into the passage 47 when the passage 47 is empty.

In the assembled configuration of FIG. 5 and as shown in FIG. 1, the tool 10 is useable for work upon a remote location such as a ceiling 12. The universal joint on tool 16 permits lateral movement of handle 18 in any direction, and coupling 16 permits axial rotation as may be necessary to accomplish the task at hand. The handle is quickly disassembled for use on another tool, or for transport, cleaning, repair or the like.

While there has been shown and described a preferred embodiment of a tool assembly according to the invention, it is apparent that certain deviations can be had from the embodiments shown without departing from the scope and spirit of the invention.

The embodiments of the invention in whcih an exclusive privilege or property is claimed are defined as follows:

1. A tool assembly comprising: a surface-working tool for texturizing interior walls and ceilings; a handle including an elongate pole member; quick release coupling connecting the handle to the tool permitting axial rotation of the handle with respect to the tool, a first portion of the coupling being connected to an end of the elongate pole member and a second portion of the coupling being connected to the tool;

one portion of the coupling being a female portion including a tubular mounting sleeve with an internal passage and a plurality of radial openings in the side wall of the sleeve open to the passage;

a plurality of locking elements located in the radial openings of the mounting sleeve and having a transverse dimension greater than the length of the radial opening, said locking elements being movable to a first position partially protuding into the tubular passage and a second position out of blocking relationship to the tubular passage, a locking sleeve slidably disposed over the mounting sleeve and having an inner side wall normally holding the locking elements in the first position, an inner annular recess in said inner side wall of the locking sleeve at the outer end of the female coupling movable to a position in alignment with the radial openings of the mounting sleeve to permit movement of the locking elements to the second position partially occupying the inner annular recess of the locking sleeve;

bias means normally biasing the locking sleeve in the first position with the locking elements in the first position;

the other portion of the coupling comprising a male portion including a shank having a diameter corresponding to the diameter of the tubular passage, said shank having a reduced diameter neck portion, and a head forward of the neck portion, said shank being insertable into the tubular passage of the mounting sleeve when the locking sleeve is in the second position with the locking elements out of blocking relationship to the passage, to a position where the neck is aligned with the radial passages of the mounting sleeve so that the locking sleeve can be moved into the first position with the locking elements movable into the portion of the tubular passage surrounding the reduced diameter neck portion of the shank preventing longitudinal movement of the shank and permitting axial rotation thereof.

2. The tool assembly of claim 1 including: a universal joint connecting the tool to the second portion of the coupling.

3. The tool assembly of claim 2 wherein: said tool includes a base having a flat working surface on one side, mounting means on the other for mounting the universal joint, said mounting means including a pair of parallel upstanding plates connected to the base, a first pivot pin disposed between the plates, a sleeve surrounding the pivot pin between the plates for axial rotation about a first axis, an eye fixed to the sleeve and having a central opening, a second pivot pin disposed in the eye for axial rotation about a second axis perpendicular to the first axis, a yoke member connected to the second pivot pin and connected to a body portion, said body portion connected to the second portion of the coupling means.

4. The tool assembly of claim 3 wherein: said bias means includes a helical spring, an inner annular groove disposed on the locking sleeve at the end opposite the inner annular recess, said spring being located in said groove, and means closing the outer end of said groove to hold the spring in place but permit longitudinal movement of the sleeve.

5. The tool assembly of claim 4 including: an outwardly extended flange located on the end of the mounting sleeve to limit movement of the locking sleeve in the first position.

6. The tool assembly of claim 5 wherein: said locking elements are constituted as spherical balls.

7. the tool assembly of claim 6 wherein: said plurality of radial openings in the mounting sleeve is comprised of four symmetrically arranged openings for carrying the locking elements.

8. A tool assembly comprising:
a surface working tool for imparting texture onto interior walls and ceilings;
a handle;
a quick-release coupling having a first portion releasably interconnectable with a second portion, one portion being connected to the tool and the other portion being connected to the handle, the coupling permitting axial rotation of the handle with respect to the tool;
said first portion of the coupling having an inner sleeve having an outer surface and a tubular passage, and an outer sleeve at least partially telescopically engageable with the inner sleeve;
a plurality of radial openings in the inner sleeve, a plurality of locking elements located n the radial openings of the inner sleeve and movable between a first position partially protruding into the tubular passage of the inner sleeve, and a second position out of protruding relationship to the passageway of the inner sleeve and partially outwardly extended from the outer surface of the inner sleeve;
said outer sleeve having an inner wall normally in facing relationship to the radial openings of the inner sleeve to hold the locking elements in the first position, said outer sleeve having an annular recess on the inner wall alignable with the radial openings of the inner sleeve to permit movement of the locking elements from the first position to the second position to open the tubular passageway of the inner sleeve;
said second portion of the coupling including a shank having a diameter corresponding to the tubular passage of the inner sleeve and a reduced diameter neck portion, said shank being insertable in the tubular passage of the inner sleeve when the locking elements are in the second position, to a location with the reduced neck portion aligned with the radial openings of the inner sleeve so that the locking elements can be moved to the first position of partial intrusion in the tubular passage in surrounding relationship to the reduced diameter neck portion to releasably retain the shank with respect to the tubular passage of the inner sleeve thereby preventing longitudinal movement of the shank and permitting axial rotation thereof.

9. The tool assembly of claim 8 including: bias means normally biasing the locking sleeve in the first position with the locking elements in the first position.

10. The tool assembly of claim 9 including: a universal joint connecting the tool to the second portion of the coupling.

11. The tool assembly of claim 10 wherein: said tool includes a base with a flat working face on one side and mounting means on the opposite side for mounting the universal joint.

12. The tool assembly of claim 8 wherein: said outer sleeve has an inner annular groove on the inner wall at an end opposite the inner annular recess, a helical compression spring located in said groove bearing between the inner wall of the outer sleeve and a portion of the inner sleeve to bias the outer sleeve in position holding the locking elements in the first position.

13. The tool assembly of claim 12 wherein: said locking elements are comprised as spherical elements.

14. The tool assembly of claim 13 wherein: said inner sleeve has an outwardly extended flange approximate an end of the inner sleeve having said radial openings to limit telescopic movement of the outer sleeve in position holding the locking elements in the first position.

15. The tool assembly of claim 14 wherein: said plurality of radial openings is comprised of four symmetrically arranged openings for carrying the locking elements.

* * * * *